(12) United States Patent
Chen

(10) Patent No.: US 6,892,314 B2
(45) Date of Patent: May 10, 2005

(54) METHOD AND SYSTEM OF AUTOMATIC DELAY DETECTION AND RECEIVER ADJUSTMENT FOR SYNCHRONOUS BUS INTERFACE

(75) Inventor: Jonathan Yang Chen, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 09/824,389

(22) Filed: Apr. 2, 2001

(65) Prior Publication Data

US 2002/0144189 A1 Oct. 3, 2002

(51) Int. Cl.[7] ............................. G06F 1/12; G06F 13/42
(52) U.S. Cl. ....................... 713/401; 713/400; 713/500; 713/600
(58) Field of Search ................................. 713/500, 400, 713/401, 600; 327/141, 161; 326/93

(56) References Cited

U.S. PATENT DOCUMENTS

| | | | |
|---|---|---|---|
| 3,784,907 A | | 1/1974 | Eichelberger ................. 324/57 |
| 5,280,629 A | * | 1/1994 | Lo Galbo et al. ............ 455/503 |
| 5,465,346 A | | 11/1995 | Parks et al. .................. 395/296 |
| 5,509,038 A | | 4/1996 | Wicki .......................... 375/371 |
| 6,105,144 A | * | 8/2000 | Wu ............................. 713/401 |
| 6,202,168 B1 | * | 3/2001 | Saito et al. .................. 713/600 |
| 6,335,647 B1 | * | 1/2002 | Nagano ....................... 327/161 |

FOREIGN PATENT DOCUMENTS

EP           0 585 086 A2    3/1994    .......... G01R/31/28

* cited by examiner

*Primary Examiner*—Chun Cao
(74) *Attorney, Agent, or Firm*—Lynn L. Augspurger

(57) ABSTRACT

An automatic delay detection and receiver adjustment method for a synchronous communications bus system sends a test pattern to the receivers of the system during a detection phase, uses the test pattern to determine a longest delay time for each bus lone, and adjusts a receiver for each bit line to receive incoming signals at a time based on the determined longest delay time.

3 Claims, 5 Drawing Sheets

METHOD AND SYSTEM OF AUTOMATIC DELAY DETECTION AND RECEIVER ADJUSTMENT FOR SYNCHRONOUS BUS INTERFACE

FIELD OF THE INVENTION

The present invention relates generally to synchronous bus transactions in digital systems, and more particularly to such systems in which the delays of the interface are greater than the system cycle time.

BACKGROUND OF THE INVENTION

In a synchronous digital system, especially in a computer system, synchronous buses are preferred and commonly used in between subsystems as interface buses (usually chip-to-chip interfaces) to achieve the high bandwidths required for those systems. For synchronous bus transactions to function properly, both sender (multiple bits of binary lines) and receiver sides must operate on a synchronous clock from a common clock oscillator and possibly via phase locked loop circuits on both sides for high frequency systems. Another requirement is that the receiver side must capture all the signal bits of the bus on the same clock cycle to maintain the synchronization.

When the worst-case delay from the sender flip-flops or latches to the receiver flip-flops (FF) (minus the FF setup time) is less than one cycle time (clock period) and the best-case delay is more than the FF hold time, the synchronous bus transaction across the interface has one-cycle delay. That is the simplest synchronous bus interface. However, in high frequency synchronous systems wherein the worst-case delay is more than one cycle and the delay differences among the bits/lines of the bus are more than the cycle time, synchronous bus transactions become much more difficult.

This synchronous bus transaction delay problem has been addressed by others by mainly two approaches. The first approach is to fine tune all the bits of a synchronous bus by adding extra delay (extended wire length) to the bit lines with less delay. This approach tightens the interface physical design requirement and complicates the system design; it is still difficult to determine in which cycle to capture data even with this approach at high frequencies.

The second known approach is using various source-synchronous techniques to align signal bits and the clock (such as "Dynamic Wave-pipelined Interface Apparatus and Methods Therefor." filed October 1999, IBM U.S. Pat. No. 6,654,897 issued 25 Nov. 2003), as well as signal buffering and rotations at the receiver side (such as "An Elastic Interface Apparatus and Method Therefor." filed October 1999, IBM U.S. Pat. No. 6,334,163 issued 25 Dec. 2001). Some of those source-synchronous interface and buffering techniques are very sophisticated, but these techniques are also complicated and their implementations require larger circuitry than the method and system of this invention.

SUMMARY OF THE INVENTION

The present invention is a method of automatic delay detection and receiver adjustment for a synchronous bus with multiple-cycle delays. The primary application of this invention is signal and data transfers between integrated-circuit chips in a synchronous system, but this invention's applications are not limited to chip interfaces alone.

A system implemented with this method is capable of determining whether the sender to receiver delay of every signal (or data) bit is more than the projected capture cycle time (not necessarily one cycle) during a detection and calibration period and to store this delay information in the receiver circuitry. Then the receivers are individually adjusted to receive signals at the appropriate cycle time based on the delay information. Therefore, a synchronous interface implemented with this invention will be able to transfer data with a minimum number of cycles across the interface that is optimized based on the delay limit of that particular bus interface thus achieving the best bandwidth possible.

Because the receiving time of each receiver (capture time of each receiver flip-flop or latch) is adjusted based on its sender to receiver delay, it is not required that all data bits must arrive at the receivers within the one cycle prior to the capture clock edge of the receiver flip-flops that transfer the signals to the receiving chip internal logic.

This method of automatic delay detection and receiver adjustment for synchronous bus transactions allows higher frequency transfer and achieves much better tolerance to bus bit misalignments than conventional synchronous bus transactions.

BRIEF DESCRIPTION OF THE DRAWINGS

The objects and features of the invention will be understood by a reading of a detailed description, taken in conjunction with the drawings, in which.

DETAILED DESCRIPTION OF THE INVENTION

Figure 1:
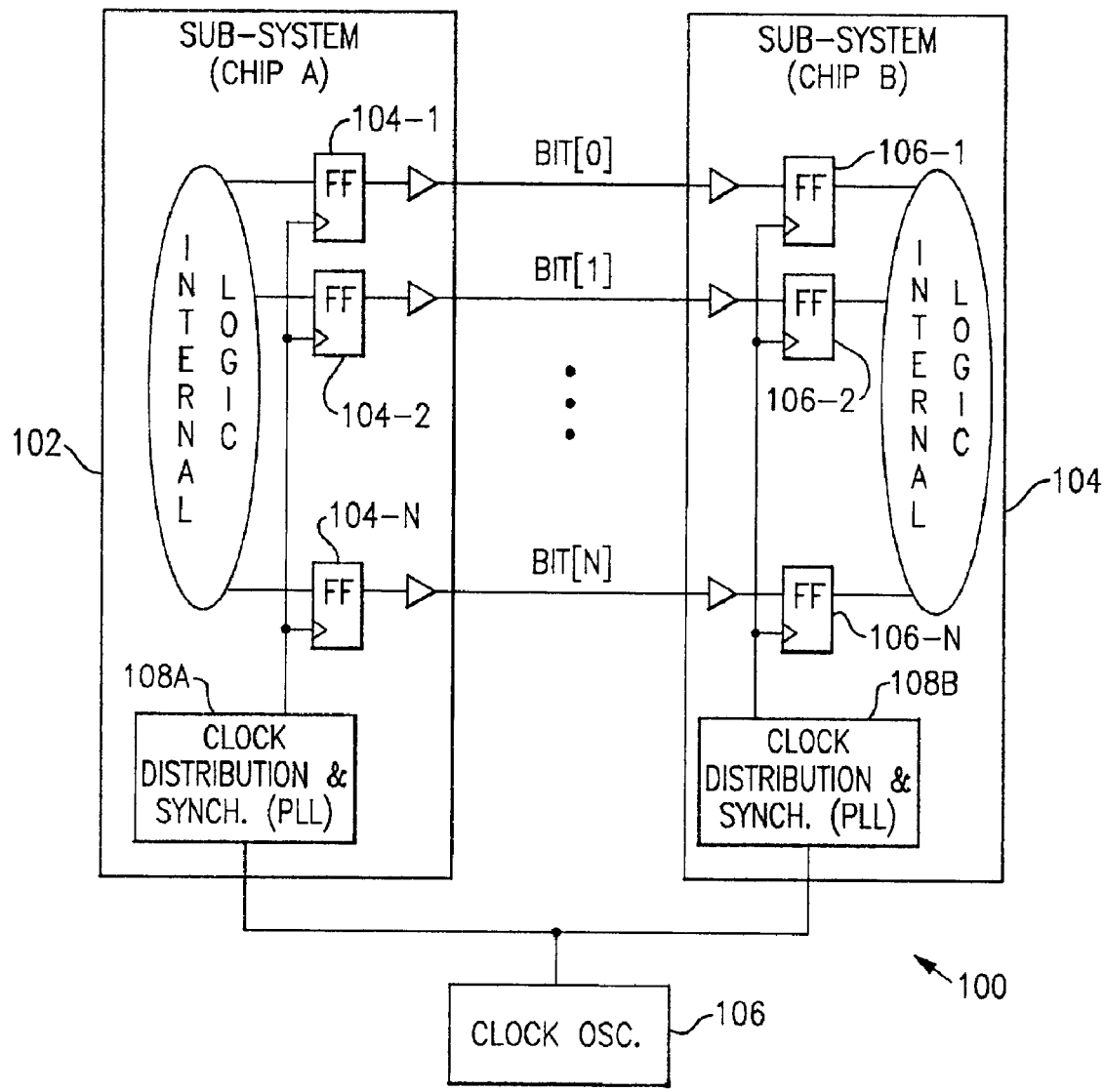
FIG. 1 sets forth a block diagram of a typical synchronous bus interface.

In a digital system with synchronous bus interface 100 as shown by FIG. 1, the sender subsystem 102 includes one or more integrated circuit chips, such as Chip A, and the receiver subsystem 104, including one or more chips, such as Chip B, maintain clock synchronization by a common clock reference 106. This common clock source 106 is usually provided by a clock/crystal oscillator circuitry or chip. Both subsystems 102 and 104 minimize clock skew through some clock distribution techniques and in most cases with phase-locked loops (PLL) 108A and 108B in high frequency systems. FIG. 1 shows Chip A 102 as the sender and Chip B 104 as the receiver. However, in a bi-directional bus interface, a subsystem, such as Chip A or Chip B in FIG. 1, is a sender and a receiver. FIG. 1 illustrates a unidirectional N-bit bus interface in which the sender flip-flops (FF) 104-I through 104-N, or master-slave latch pairs in a level-sensitive scan design (LSSD), in Chip A 102 transfer signals to the receiver flip-flops (FF) 106-I through 106-N or latches in Chip B 104.

Figure 2:
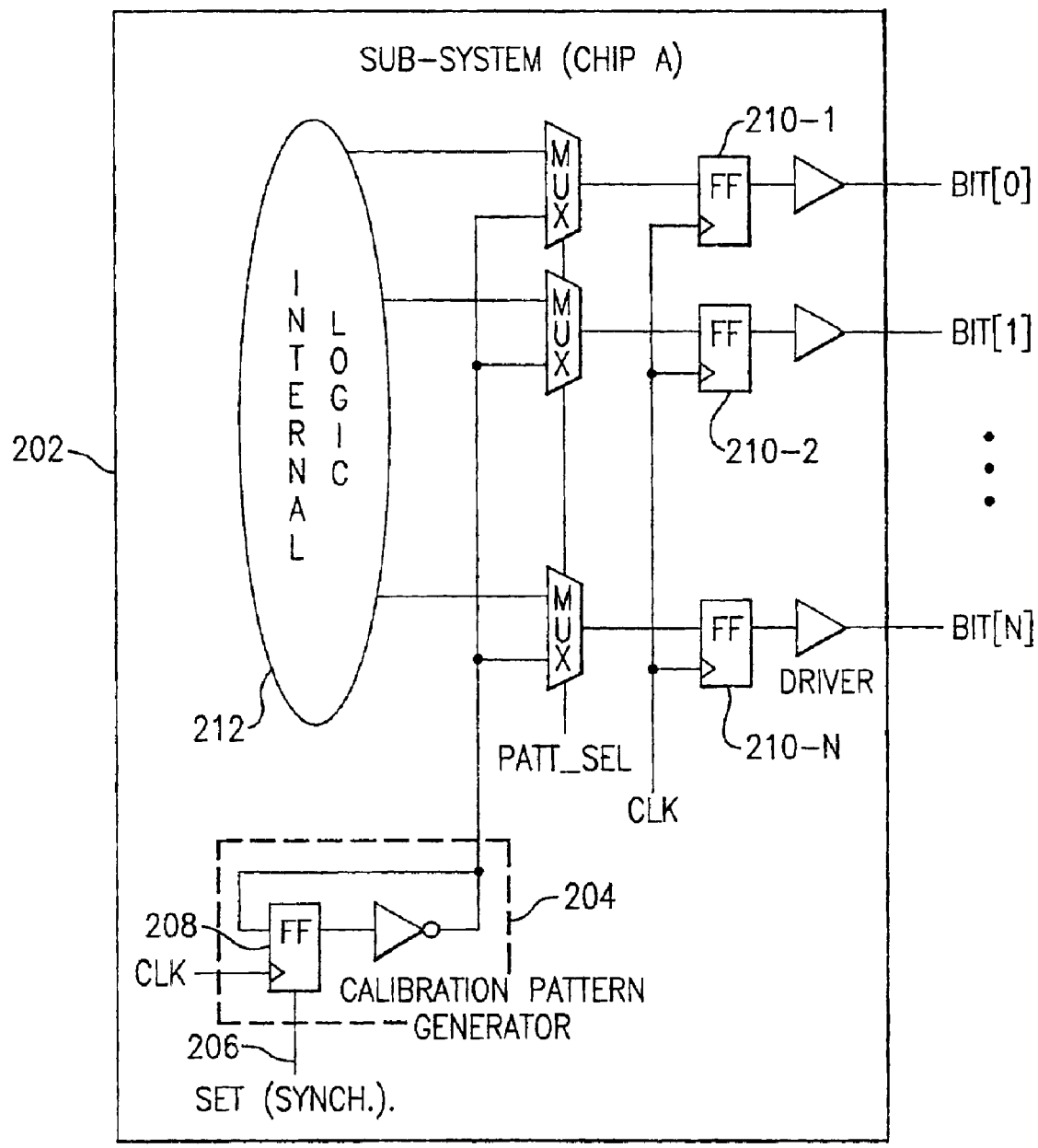
FIG. 2 illustrates circuitry for delay detection in the sender side of a bus interface arranged in accordance with the principles of the invention.

To determine the sender to receiver delay, a system arranged in accordance with the principles of this invention first goes through a delay detection and calibration phase. During this phase, the sender 202 as shown by FIG. 2 launches a stream of test patterns for a few thousand cycles. The simplest test pattern is a "10101 . . . " toggle pattern generated by the Calibration Pattern Generator logic 204 in FIG. 2. A variety of other test patterns, such as an "110110 . . . " pattern, can be used to improve the accuracy and reliability of delay detection and calibration for the system. The set(synch.) 206 signal to the FF 208 of the Calibration Pattern Generator 204 is to illustrate that the test patterns need to be synchronized with the select signal 350 of the Worst Delay Detect Logic 306 in FIG. 3. The test patterns are used by the receiver side 304 (FIG. 3) to determine the worst-case (longest) delays in the few thousand test cycles.

Figure 3:
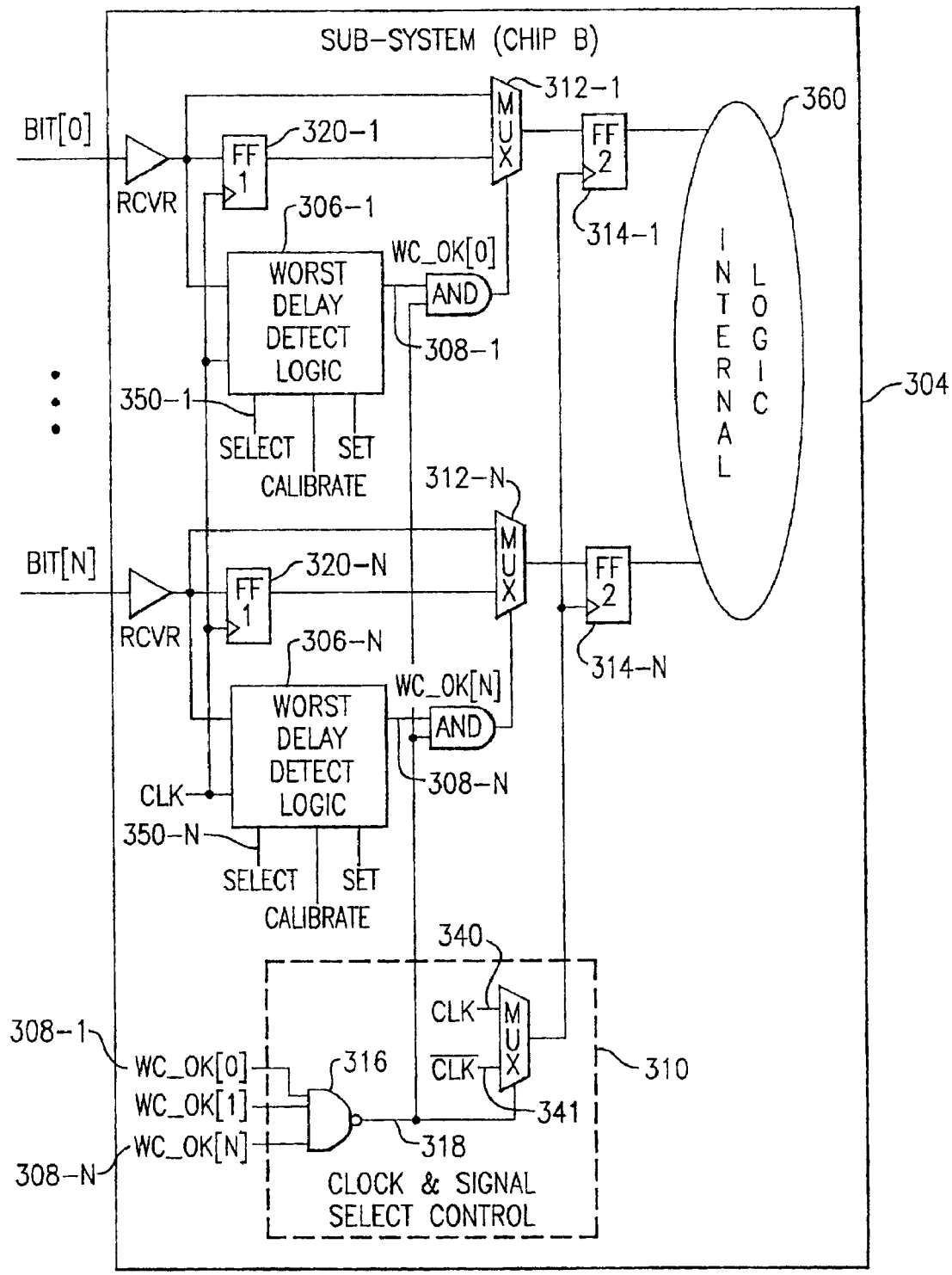
FIG. 3 illustrates circuitry for delay detection, calibration, and normal operation in the receiver side of the bus interface.

FIG. 3 illustrates the receiver circuits with the Worst Delay Detect Logic circuits 306 of this invention. During the delay detection and calibration phase, the output signal wc_ok 308 of the Worst Delay Detect Logic for every bit of the bus is determined. If the delay of the test pattern received in a receiver bit is ever more than the targeted capture clock edge during the delay detection phase, signal wc_ok 308 for that bit is cleared as a logic 0. Otherwise, it stays as logic 1. The output signals (wc_ok's) from all the Worst Delay Detect Logic circuits 350 are used by the Clock & Signal Select Control Logic 310 as shown in FIG. 3 to select the MUX's 312-I through 312-N and the clock for FF2's 314-I through 314-N of the receivers.

In case all wc_ok's are at logic 1's, the NAND gate 316 output 318 of the Clock & Signal Select Control Logic 310 in FIG. 3 is at logic 0. The incoming bus signals Bit[0:N] instead of the output of FF1's 320-I through 320-N are selected as the input of FF2's 314-I through 314-N. The same clock used for Worst Delay Detect Logic 306-I through 306-N is selected as the clock for FF2's to capture the bus signals Bit[0:N].

If one or more output signals of the Worst Delay Detect Logic 306 is at logic 0, the output of the NAND gate 316 in FIG. 3 is set to logic 1. The bus bit whose Worst Delay Detect Logic output wc_ok 308 is at logic 1 will select FF1 output as FF2 input to capture the early bit at an early time. The bus bit whose Worst Delay Detect Logic output wc_ok 308 is at logic 0 will select the bus bit directly as FF2 input to capture the late bit at a later time. The inverted clock 341 is selected as the clock for FF2's as well as for the internal logic 360 of the chip 304. Then the system is ready for normal operation.

The delay detection and calibration phase of the system must be done first before the system is ready for the bus transfers. Normally this phase is carried out within a few thousand cycles when the system is first powered up. During the system normal operation, it is not necessary to run this delay detection and calibration procedure again.

It is necessary to emphasize here that having the sender of chip 202 and receiver of chip 304 subsystems operate with 180° out-phased clocks (inverted clocks for FF2 of Chip B 360 and the internal logic in FIG. 3 when one or more output signals of the Worst Delay Detect Logic 306 is at logic 0) is one typical implementation. In a system with multiple subsystems wherein it is inconvenient or difficult to have out-phased clocks for the chip internal logic blocks among senders and receivers, the implementation of this invention requires to have the sender FF's 210-I through 210-N in FIG. 2 and the receiver FF1's 320-I through 320-N in FIG. 3 switch to the 180° out-phased clock in reference to FF2's 314-I through 314-N in FIG. 3 and the sender and receiver internal logic 212 and 360 when one or more output signals of the Worst Delay Detect Logic is at logic 0. In such an alternative implementation, a 1-bit indicator signal from the receiver to the sender or through other communication method between them is needed for the sender to select non-inverting 340 or inverting 341 clock for its driver FF's 314-I through 314-N. It is also necessary to make sure that the combination logic paths from the sender internal logic 212 to the driver FF's do not violate the driver FF setup time when the sender FF's operate on the 180° out-phased clock. There are many known methods to address such timing issues.

The most common application of this system is for worst-case delay less than 1.5 clock periods. The skew among all the bus bits can be almost 1.5 clock periods instead of less than 1 clock period required by a conventional synchronous bus interface. The requirement is that the best-case delay must be within 1 cycle prior to the clock capture edge of the Worst Delay Detect Logic and the worst-case delay cannot be more than 0.5 cycle later than the same clock edge. Another requirement for the system of this invention is that the best and worst case delay of a bus bit for any bit patterns in the specified environment (temperature, voltage, etc.) must be less than 0.5 of the clock period.

For a bus interface that the best and worst-case delay is between ½ and 2 clock periods, the clock for the Worst Delay Detect Logic needs to be out-of-phase in reference to the sender chip clock. This invention can also be used in cases where the worst-case delay is more than 2 clock periods/cycles as long as the bus meets the timing requirements described in the previous paragraph. The clock frequencies of the sender or receiver subsystem can also be the multiples or a half of the frequency of the bus transaction in which cases the system requires minor modifications in the implementations.

One variation of this method and system is to send the driver clock with the bus bits as the clock for the receiver Worst Delay Detect Logic and FF1's 320-I through 320-N in FIG. 3. The advantage of doing so is that FF1's 320-I through 320-N are source-synchronized so there are less PLL jitter problems at high frequencies. The received driver clocks must have a known phase relationship with the receiver clock.

It is also possible to have multiple Worst Delay Detect Logic circuits operate at different clock phases for every bus bit for more precise delay detection and finer steps of receiver FF capture times.

Figure 4:
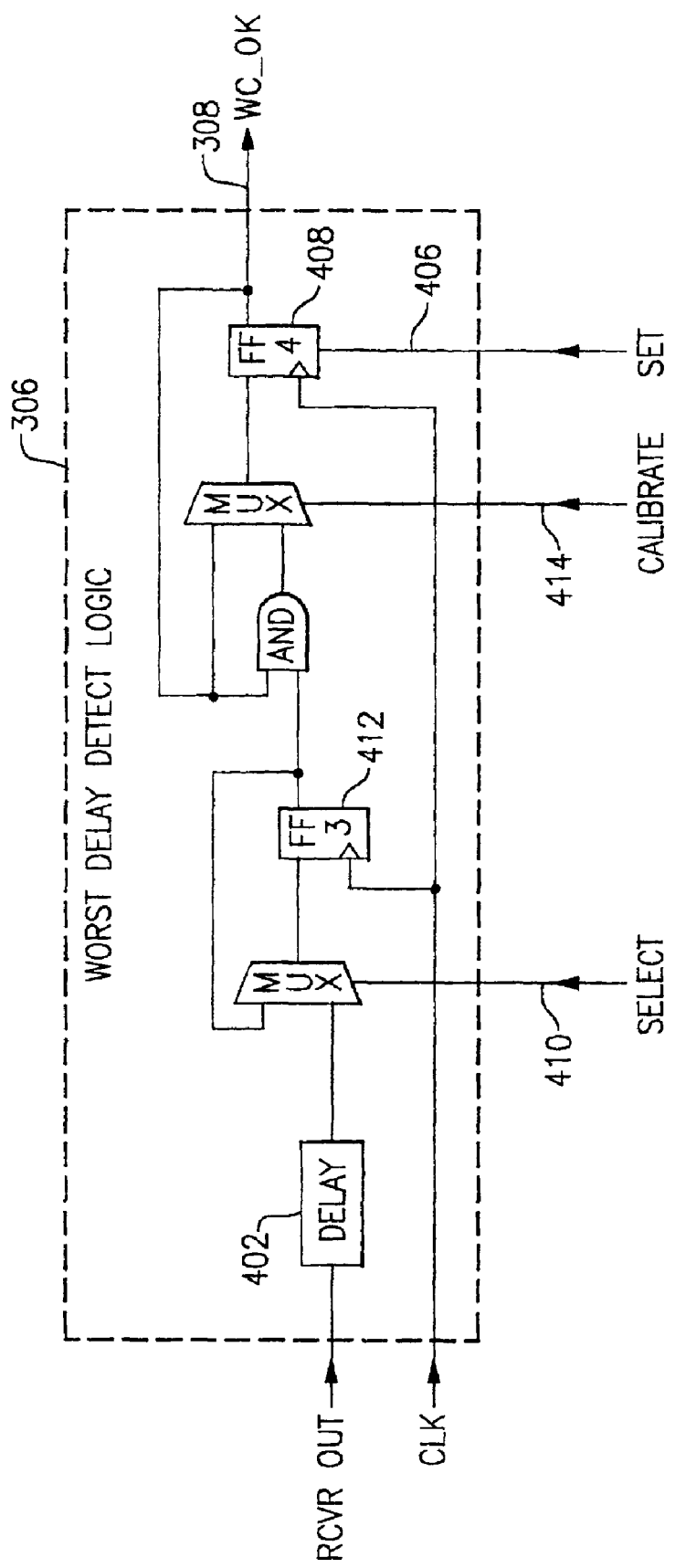
FIG. 4 illustrates an implementation of the Worst Delay Detect Logic of the system for one receiver bus bit in accordance with the invention.
Figure 5:
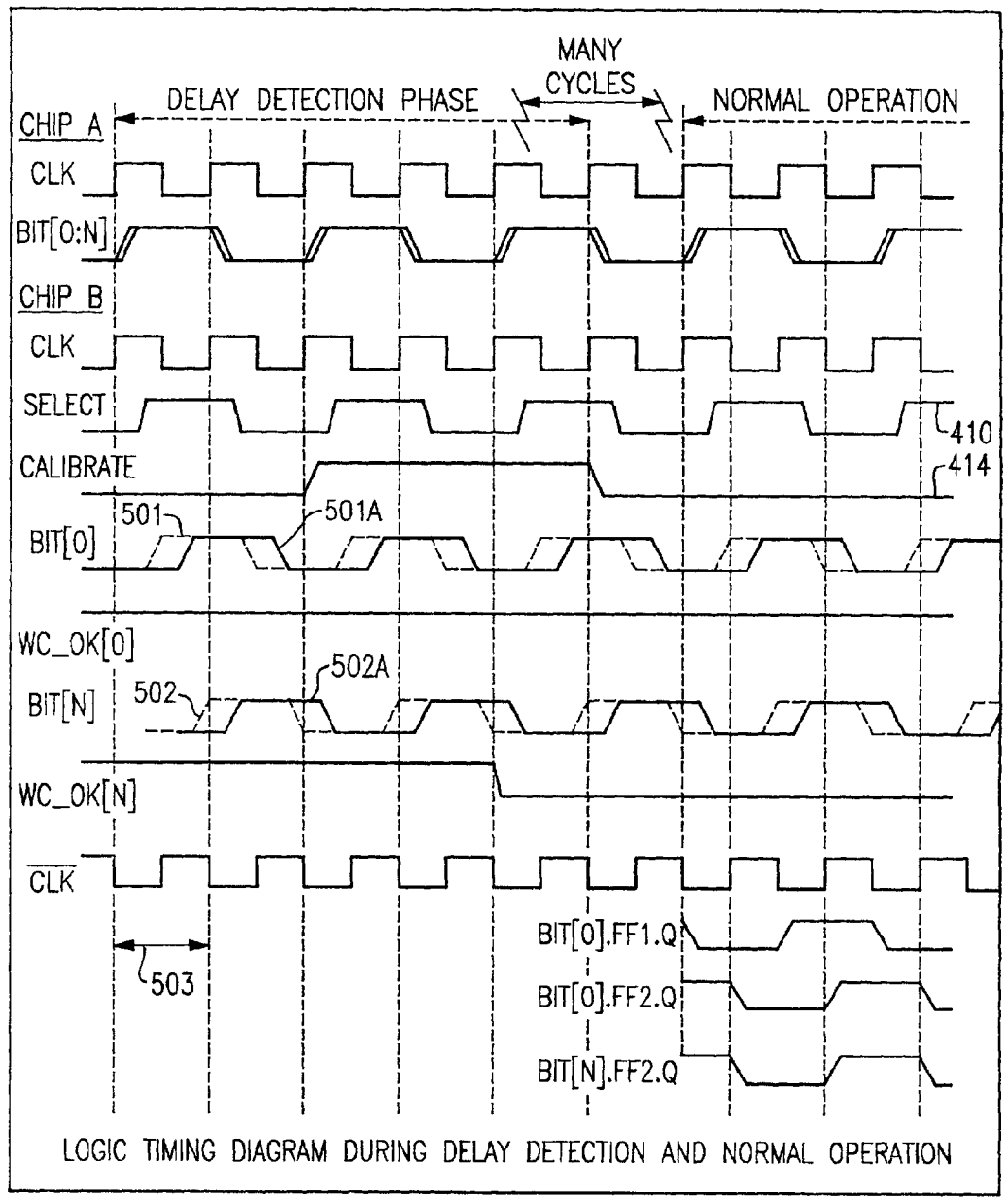
FIG. 5 illustrates the logic timing of the system of FIGS. 2 and 3 when the worst-case delay is less than 1.5 clock periods.

FIG. 4 illustrates a typical implementation of the Worst Delay Detect Logic 306 of FIG. 3. An optional delay element 402 is added to delay the bus bit in a fraction of the clock period to compensate the worst-case delay difference between the "10101 . . . " test pattern and a real signal which is usually worse than the test pattern. The set signal 406 to FF4 408 (scan initialize is an alternative) in FIG. 4 is used to set the output wc_ok 308 to a logic 1 prior to the delay detection and calibration phase. As FIG. 5 shows, the select signal 410 of FIG. 4 is a toggle pattern which is synchronized with the "10101 . . . " test pattern so that FF3 412 samples the test pattern in alternating cycles for delay detection. The calibrate signal 414 in FIG. 4 can only be enabled (to logic 1) when the receiver input is the "10101 . . . " test pattern. As FIG. 5 shows, the Worst Delay Detect Logic output wc_ok[0] stays at logic 1 for Bit[0] whose worst-case arrival time is earlier than the clock rising edge, and the Worst Delay Detect Logic output wc_ok[N] switched to logic 0 for Bit[N] whose worst-case arrival time is later than the clock rising edge during the delay detection phase when the calibrate signal 414 in FIG. 4 is at logic 1.

As shown in FIG. 5, the sender Chip A 202 sends the "10101 . . . " test pattern in all bus bits during the delay detection phase. The dashed lines 501 for Bit[0] and 502 for Bit[N] wave forms at the receiver Chip B 304 indicate the earliest possible bit arrival times and the solid lines 501A, 502A indicate the latest possible bit arrival times. FIG. 5 shows the case that the worst-case delay among all bus bits is less than 1.5 of the clock period.

After the calibration in the delay detection phase, the early-arrival Bit[0] is captured by FF1 320-I of FIG. 3 (shown as Bit[0].FF1.Q as FF1 output) then transferred to FF2 314-I to synchronize with the late-arrival bus Bit[N]. The bus bits can be any pattern instead of the toggle pattern shown in FIG. 5.

While the preferred embodiment to the invention has been described, it will be understood that those killed in the art, both now and in the future, may make various improvements and enhancements which fall within the scope of the claims which follow. These claims should be constructed to maintain the proper protection for the invention first described.

What is claimed is:

1. A method of automatic delay detection and receiver adjustment for a synchronous communications bus system with multiple cycle delays, the method comprising the steps of:

(a) defining a delay detection and calibration phase for said synchronous communications bus system with multiple delays over multiple bus lines;

(b) sending during said delay detection and calibration phase a predefined bus signal test pattern for each bus line;

(c) using the predefined bus signal test pattern to determine a longest delay time for each bus line of said multiple bus lines during the delay detection and calibration phase;

(d) adjusting a receiver for each bit line of said multiple bus lines to receive incoming signals for each bus line at a time based on the determination of step (c); and after the detection and calibration phase is complete, (e) placing the bus system in a normal communication mode.

2. In a synchronous communications bus system having a sender subsystem and a receiver subsystem having multiple bus lines, comprising:

an apparatus for detecting delay and adjusting all receivers in the receiving subsystem having multiple bus lines, the apparatus including worst case delay detection circuitry for each bit of the receiving subsystem bus lines; and control circuitry coupled to the worst case delay detection circuitry for each bit; operative to select one of two receiver paths for each bit as a function of each bit's delay detection circuitry output and clock signals associated with each bit's receiver latch in the receiving subsystem.

3. The apparatus of claim 2 wherein at least two of the bits have worst case delay detection circuitry adapted to use different clock phases of the synchronous bus system.

* * * * *

UNITED STATES PATENT AND TRADEMARK OFFICE
CERTIFICATE OF CORRECTION

PATENT NO. : 6,892,314 B2  Page 1 of 1
APPLICATION NO. : 09/824389
DATED : May 10, 2005
INVENTOR(S) : Jonathan Yang Chen It is certified that error appears in the above-identified patent and that said Letters Patent is hereby corrected as shown below:

Abstract:

Line 5, delete "lone" and insert --line--

Signed and Sealed this

Twelfth Day of December, 2006

JON W. DUDAS
*Director of the United States Patent and Trademark Office*